US011945701B1

(12) United States Patent
Brunner

(10) Patent No.: US 11,945,701 B1
(45) Date of Patent: Apr. 2, 2024

(54) LIFT

(71) Applicant: MAJIC STAIRS INC., Ocala, FL (US)

(72) Inventor: Ronald N. Brunner, The Villages, FL (US)

(73) Assignee: MAJIC STAIRS INC., Ocala, FL (US)

( * ) Notice: Subject to any disclaimer, the term of this patent is extended or adjusted under 35 U.S.C. 154(b) by 157 days.

(21) Appl. No.: 17/347,958

(22) Filed: Jun. 15, 2021

Related U.S. Application Data

(60) Provisional application No. 63/113,330, filed on Nov. 13, 2020.

(51) Int. Cl.
*B66D 3/20* (2006.01)
*B66D 3/26* (2006.01)

(52) U.S. Cl.
CPC *B66D 3/20* (2013.01); *B66D 3/26* (2013.01)

(58) Field of Classification Search
CPC ... B66D 1/12; B66D 1/38; B66D 1/39; B66D 3/04; B66D 3/20; B66D 3/26; B66B 9/00; B66B 11/00; B66B 11/0005; B66B 11/06; B66F 11/04; B63B 27/16; E04G 3/28; E04G 3/30; E04G 3/32
USPC .......................................................... 254/338
See application file for complete search history.

(56) References Cited

U.S. PATENT DOCUMENTS 1,594,655 A 8/1926 Bessler
1,614,005 A 1/1927 Loetscher
1,636,279 A 7/1927 Bessler
1,636,280 A 7/1927 Bessler
1,636,281 A 7/1927 Bessler
1,811,709 A 6/1931 Bessler
1,858,981 A 5/1932 Bessler
2,564,954 A 8/1951 Brelsford
2,572,281 A 10/1951 Pierce
2,593,336 A 4/1952 Nixon
2,649,237 A 8/1953 Bjorklund et al.
2,931,456 A 4/1960 Harmon
2,968,048 A * 1/1961 Roberge ................. A47C 17/84 5/10.1
3,408,959 A 11/1968 Cripe et al.
3,789,955 A 2/1974 Knapp
3,804,268 A * 4/1974 Barron ..................... B66D 1/48 414/139.6
3,985,202 A 10/1976 Harmon
(Continued)

FOREIGN PATENT DOCUMENTS

WO WO-2011054991 A1 * 5/2011 ............. A47B 51/00
WO WO-2014058307 A1 * 4/2014 ............ B60P 3/1066

*Primary Examiner* — Michael R Mansen
*Assistant Examiner* — Henrix Soto
(74) *Attorney, Agent, or Firm* — Frijouf, Rust & Pyle, P.A.

(57) ABSTRACT

A lift is disclosed for ascending and descending between a lower elevation and an upper elevation. The lower elevation has a lower surface and the upper elevation has an upper surface. The lift comprises a main frame coupled to the upper surface. A carrier frame transitions between the lower elevation and the upper elevation. A drive is coupled to the main frame. A linkage extends between the carrier frame and the drive. A linkage block system is coupled to the main frame and engages the linkage for redirecting the direction of the linkage. A drive coupler secures the drive to the main frame. The drive coupler defines an eccentric position relative to the main frame for positioning the drive in an offset orientation relative to the main frame.

13 Claims, 11 Drawing Sheets

(56) References Cited

U.S. PATENT DOCUMENTS

| | | | | | |
|---|---|---|---|---|---|
| 4,157,742 | A | | 6/1979 | Aanensen | |
| 4,541,508 | A | | 9/1985 | Lundh | |
| 4,787,111 | A | | 11/1988 | Pacek et al. | |
| 4,950,010 | A | * | 8/1990 | Denny | B60R 19/48 280/460.1 |
| 5,111,906 | A | | 5/1992 | Abadia | |
| 5,174,411 | A | | 12/1992 | Oliver et al. | |
| 5,239,795 | A | | 8/1993 | Breaux | |
| 5,535,852 | A | * | 7/1996 | Bishop | B66B 9/00 312/247 |
| 5,626,440 | A | | 5/1997 | Greene, Jr. et al. | |
| 5,667,035 | A | * | 9/1997 | Hughes | B66F 7/02 182/142 |
| 6,105,728 | A | * | 8/2000 | Combs, Jr. | B66B 9/00 187/361 |
| 6,131,702 | A | * | 10/2000 | Berridge | B66B 9/00 187/336 |
| 6,507,962 | B2 | * | 1/2003 | Thurston | A47C 17/84 5/10.1 |
| 6,739,100 | B1 | | 5/2004 | Lewandowski | |
| 6,802,392 | B1 | | 10/2004 | Davis | |
| 6,866,118 | B1 | | 3/2005 | Battenberg | |
| 6,886,661 | B1 | | 5/2005 | Battenberg | |
| 7,416,055 | B2 | * | 8/2008 | Penn | B66B 11/06 182/144 |
| 7,527,242 | B2 | * | 5/2009 | Shaha | E04H 6/42 254/338 |
| 7,575,098 | B2 | * | 8/2009 | Hartley | B66B 9/00 248/330.1 |
| 7,621,374 | B2 | | 11/2009 | Richey | |
| 7,870,932 | B2 | | 1/2011 | Lapke et al. | |
| 8,028,804 | B2 | | 10/2011 | Lair | |
| 8,418,814 | B1 | * | 4/2013 | Byers | B66B 9/00 312/247 |
| 8,702,069 | B1 | | 4/2014 | Byers | |
| 8,851,238 | B2 | | 10/2014 | Byers | |
| 9,420,881 | B2 | * | 8/2016 | Reid | A47B 51/00 |
| 9,957,720 | B1 | | 5/2018 | Brunner | |
| 2006/0201980 | A1 | * | 9/2006 | Koons | B60D 1/075 254/323 |
| 2007/0181364 | A1 | | 8/2007 | Lair | |
| 2008/0179137 | A1 | | 7/2008 | Latimer et al. | |
| 2009/0166129 | A1 | | 7/2009 | Siler et al. | |
| 2009/0255757 | A1 | | 10/2009 | Burke | |
| 2010/0192487 | A1 | | 8/2010 | Thornton et al. | |
| 2012/0005972 | A1 | | 1/2012 | Burke | |
| 2012/0199417 | A1 | | 8/2012 | Richey et al. | |
| 2012/0305335 | A1 | * | 12/2012 | Klumpers | B66B 11/00 187/266 |
| 2013/0269163 | A1 | * | 10/2013 | Sears | B66B 11/08 254/338 |
| 2015/0047273 | A1 | | 2/2015 | Whitten et al. | |
| 2017/0022031 | A1 | * | 1/2017 | Roshto | B66B 9/00 |
| 2019/0218076 | A1 | * | 7/2019 | Fulk, II | B66D 1/28 |

* cited by examiner

LIFT

CROSS-REFERENCE TO RELATED APPLICATIONS

This application claims benefit of U.S. Patent Provisional application No. 63/113,330 filed Nov. 13, 2020. All subject matter set forth in provisional application No. 63/113,330 is hereby incorporated by reference into the present application as if fully set forth herein.

BACKGROUND OF THE INVENTION

Field of the Invention

This invention relates to transporters and more particularly to a lift.

Background of the Invention

Utilizing a lift for transitioning an individual or object from a lower elevation to an upper elevation has many advantages. For example, the area of a structure may be many types multiplied by utilizing both a lower elevation and an upper elevation as opposed to utilizing solely the lower elevation. The additional space being utilized maybe for the purpose of storage, office space and or resident space. By utilizing this additional space the occupier may save money by not renting outside rental space.

Although utilizing the additional space in an upper elevation may be advantageous, the storage of a lift may be problematic, positioning the lift for utilization may be time-consuming and the process of utilizing the lift by an individual may be dangerous.

There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 1,594,655 to Bessler discloses a frame, a shaft supported for rotation on the frame. A first drum is fixed to the shaft. A second-drum is rotatable on the shaft and partly enclosed by the first drum. A torsion spring is connected to the second drum and to the shaft. A stub shaft is supported on the frame. A roller is on the stub shafts. A guide plate is mounted to swing on the stub shaft. A panel is hinged to the frame. A stairway is slidable on the panel and on the roller. The stairway is slidable on the guide plate. A first flexible element is connected at its—ends to—the first drum and to the stairway. A second flexible element is connected at its ends to the second drum and to the panel. Means are on the frame for guiding the inter mediate portion of the second-flexible element.

U.S. Pat. No. 1,614,006 to Loetscher discloses a horizontally disposed door frame, a vertically swingable door hinged at one end of the frame, spaced pairs of pulleys mounted on the door, one pair being arranged near the inner end of the door, and the other pair near the other end of the latter. A stairway is slidably mounted on the door. The pulleys are arranged at opposite sides of the stairway. Brackets are mounted at the other end of the frame. A shaft is carried by the brackets. Spaced drums are mounted at the ends of the shaft. A coiled spring are in each drum having one of its ends connected to the shaft and its other end connected to the drum. Cables connect the drums to opposite sides of the stairway. Each cable extends from a drum under one pulley of each pair of pulleys, and from the pulley nearest the hinge of the door, to the stairway.

U.S. Pat. No. 1,636,279 to Bessler discloses a frame, a latch pivoted to the frame and having a hook, a bell crank lever fulcrumed on the frame and comprising first and second arms. The first arm has a longitudinal cam edge. A friction slide cooperates with the frame. A connection is between the slide and the latch. A connection is between the slide and the bell crank lever. A keeper and means for supporting the keeper for engagement with the hook. The second arm of the bell crank and the keeper are relatively movable in one direction to cause engagement between the keeper and the second arm of the bell crank lever, and being relatively movable in an opposite direction to cause engagement between the longitudinal cam edge and the keeper.

U.S. Pat. No. 1,636,280 to Bessler discloses a support, an upper pulley carried for rotation on the support, a panel is hinged to the support for vertical swinging movement. A lower pulley is journaled on the panel. A spring-actuated drum is mounted on the support. A stairway means for mounting the stairway for sliding movement longitudinally of the panel. A flexible element is wound about the drum, the flexible element being extended downwardly around the lower pulley, rearwardly along the panel, about the upper pulley, and downwardly and forwardly along the stairway. Means for connecting the forward end of the flexible element to the stairway.

U.S. Pat. No. 1,636,281 to Bessler discloses a support, a panel hinged to the support, a stairway slidable longitudinally of the panel and having a longitudinal groove. A standard is on the panel. A guide block is pivoted to the standard and is received slidably in the groove. A hanger is on the support. An arm is pivoted to the hanger. A guide is carried by the arm and is received slidably in the groove. Means for lifting the panel and the stairway and includes a spring drum and a flexible element connected to the drum, the panel and the stairway. A latch is mounted pivotally on the standard and comprises a part received in the groove to hold the latch disposed longitudinally of the stairway. A keeper is on the stairway and is co-operating with the latch to hold the stairway retracted. An anti-rattling spring is supported by the standard and holds the latch frictionally against the standard.

U.S. Pat. No. 1,811,709 to Bessler discloses a disappearing stairway for use in a ceiling opening between a lower floor and an upper floor. The stairway comprises pivoted brackets adjacent one end of the opening. A stair structure is slidable on the brackets. Driving means include a reversible motor in an electrical circuit for sliding the stair structure on the brackets. A radius rod is pivotally connected to the upper end of the stairway and pivotally mounted on the upper floor. A manually operable switch is on each floor arranged in the circuit for starting the motor, an automatic switch for stopping the motor and reversing its connections and means operable by the radius rod to actuate the switch as the stairway moves into its extended and retracted positions.

U.S. Pat. No. 1,858,981 to Bessler discloses a disappearing stairway of the ceiling panel type comprising in combination, a panel hinged at one end of the ceiling opening, a stair structure carried by the panel and extensible and retractable thereon to reach the lower floor. Links are pivoted at their upper ends on each side of the opening. Tracks are along the side edges of the panels on which the lower ends of the links run. The tracks permits movement of the links beyond dead center positions perpendicular to the panel. Means are on the stair structure for engaging the links as the stair structure is extended to move the links beyond the dead center position. Means are on the stair structure for engaging the links to move them back of their dead center position as the stair structure is retracted, and means for lowering and raising the panel and extending and retracting the stair structure.

U.S. Pat. No. 2,564,954 to Brelsford discloses a floor, an inclined stair leading up therefrom and having a fixed upper section and a retractable lower section, means to guide the upper end of the lower section along a vertical path. The vertical guide means includes a pair of guide members between which the lower section fits and has confronting vertical slots. The vertical guide means further Include rollers carried by the upper end of the lower section and engaging the slots. Means to guide the lower end of the lower section along a horizontal path extend in opposite directions from the line of movement of the upper end of the lower section. The horizontal guide means include a spaced pair of confronting guide bars and further include rollers carried by the lower end of the lower member and engaging the guide bars, and means to effect movement of the lower end of the lower section along the horizontal path.

U.S. Pat. No. 2,572,281 to Pierce discloses a folding stairway comprising a horizontal frame, a main stair section pivoted at one end to an end of the frame and adapted to be disposed inoperatively within the confines of said frame, a sub-stair section, a pair of parallel arms on each side of said stair sections for pivotally supporting said sub-stair section on the main stair section, a toggle on each side of said frame, each comprising a link pivoted at one end to one side of said main stair section, and an arm pivoted at one end to the opposite end of said link. An eccentric pulley is mounted on each side of the frame, to the shaft of which the opposite end of said latter arm is affixed to move therewith. A primary counter balancing spring is on each side of the frame, the springs have then ends attached to the peripheries of the pulleys and their opposite ends to an end of the frame to exert a lifting force on the stair sections through the eccentric pulleys and the toggle. A pair of secondary counter balancing springs have their upper ends connected to the sides of the main stair sections and their lower ends to one of the parallel arms and effective to exert a lifting force on said sub-stair section and flexible means for stabilizing the toggle in extended position of the stair sections.

U.S. Pat. No. 2,593,336 to Nixon discloses a collapsible stairway adapted to be positioned in an opening through a floor comprising a stationary step having a tongue extended from the forward edge and a recess in the under surface of the rear edge mounted in the floor and positioned in one end of the opening. Vertically positioned-balusters are carried by the stationary step. A plurality of slidably connected intermediate steps also have over-lapping tongues on the forward edges and recesses in the upper surfaces of the rear edges which provide ledges to receive the tongues of adjoining steps. A hand-rail has a plurality of sections with overlapping tongues on the rear edges and recesses in the upper surfaces of the forward edges which provide ledges to receive the tongues of adjoining sections. Banisters are positioned on the ledges at the rear of the intermediate steps and extend through openings in tongues of upwardly disposed steps and on the upper ends of which the sections of the hand-rail are carried whereby the balusters connect the sections of the hand rail to the steps providing intermediate units of the stairway. An upper hand-rail section is carried by the vertically positioned baluster on the stationary step and has a recess in the upper surface of the forward edge for receiving the tongue of the upper intermediate section of the hand-rail. A relatively extensible stringer is pivotally mounted in the recess in the under surface of the upper stationary step, extended below the intermediate steps and positioned to be engaged by the rear edges of the intermediate steps for supporting the steps with the stairway extended downwardly for use.

U.S. Pat. No. 2,931,456 to Harmon discloses a disappearing stairway structure comprising an open frame adapted to be mounted in a ceiling, a stair way movable between an operative position extending from the frame to the floor below and a substantially horizontal inoperative position adjacent the frame. Means are cooperating between the frame and the stairway for supporting the latter for the movement. A hand rail is carried by the stairway, and guiding means carried by the frame and engage the hand rail in all positions of the stairway for guiding it for movement between the operative and inoperative positions.

U.S. Pat. No. 3,985,202 to Harmon discloses a unitary stairway (as distinguished from a sectional folding stairway) is adapted to assume an inclined operative position and an upper horizontal inoperative position above the ceiling of the room. Hydraulic means imparts longitudinal forces to the stairway to move it upwardly or downwardly, and rails carried by the stairway are engageable in guide rollers to guide the stairway between operative and inoperative positions. A wall switch is operable to energize a motor for driving a pump to generate power in the hydraulic means.

U.S. Pat. No. 5,111,906 to Abadia discloses a retractable ladder apparatus (30) for access between a lower and an upper floor is provided. A ladder (60) is moved by moving means, which may be a garage door opener (40), between a position of storage within the upper floor to a position where the lower end of the ladder abuts the lower floor.

U.S. Pat. No. 5,626,440 to Greene, Jr., et al, discloses a stairway for providing access over a dune to a beach, while being retractable to avoid damage from adverse weather conditions, the stairway being adapted to be mounted on a plurality of piling on a dune, the stairway comprising a pivotally mounted housing section having an upper surface suitable for use as a walkway and a cavity beneath the walkway; a stair section moveable between a retracted position within the housing section cavity and an extended position, wherein the stair section extends from the housing section to the beach at an angle of about 45.degree below horizontal; and drive means adapted to move the stair section between retracted and extended positions.

U.S. Pat. No. 6,739,100 to Lewandowski discloses a stairwell cover adapted to seal a stairwell opening such as between a first floor living space and a basement when the basement is not in use includes a housing mounted to a wall partition above the base of the stairs, a retractable cover rotatably mounted in the housing, and a pair of roller rails extending along the sidewalls of the stairwell and along which the cover rolls for movement between an retracted position providing open access to the basement and an extended position closing off the basement at the top of the stairwell.

U.S. Pat. No. 6,802,392 to Davis discloses a stair is pivotable from a lowered position allowing a user to climb the stair from a lower level to an upper level, into a stowed position wherein the stair is lifted from the lower level so that the plane of the stair is approaches the ceiling situated between the lower and upper level. The stair, which is preferably not articulated (i.e., the stair does not fold), rotates between the lowered and stowed positions about a pivot fixed in association with the ceiling. A drive cable, which preferably extends from the stair top or from a drive arm extending from the stair top, is anchored to surrounding structure in the upper level. A drive motor drives the drive cable to draw the stair top downwardly, thereby raising the stair bottom about the pivot.

U.S. Pat. No. 6,866,118 to Battenberg discloses a ladder apparatus for providing access to an area over an elevated structure, the ladder apparatus including a housing secured to the elevated structure; a ladder pivotally mounted to the housing, the ladder means including an upper ladder section and at least one lower ladder section mounted to the upper ladder section; and a motorized deploying mechanism structured to controllably allow the ladder apparatus to be pivotally and gravitationally deployed from a stowed configuration to a partially deployed configuration, controllably allow the at least one lower ladder section to be longitudinally and gravitationally deployed from the partially deployed configuration to a fully deployed configuration, longitudinally retract the at least one lower ladder section from the fully deployed configuration to the partially deployed configuration, and pivotally retract the ladder apparatus from the partially deployed configuration to the stowed configuration. A control mechanism operatively controls the motorized deploying mechanism. A power source provides electrical energy to the motorized deploying mechanism and to the control mechanism.

U.S. Pat. No. 6,886,661 to Battenberg discloses a ladder apparatus for providing access to an area over an elevated structure, the ladder apparatus including a housing secured to the elevated structure wherein the housing includes a housing mechanism having a central opening, a ladder pivotally mounted to the housing mechanism wherein the ladder includes a first ladder section and at least one additional ladder section slidingly mounted to the first ladder section, first motorized deploying mechanism structured to pivotally displace the ladder to and from a stored configuration and a partially deployed configuration, second motorized deploying mechanism structured to linearly displace the at least one additional ladder section to and from a partially deployed configuration and a fully deployed configuration; and control mechanism structured to operatively control the first and second motorized deploying mechanism.

U.S. Pat. No. 8,028,804 to Lair discloses an access panel is shown in the present invention to provide easy and safe access to an attic space or elevated structure. The access panel is fully automatic. During opening, the access panel uses an energizing motor to control the gravitational forces for opening a cover and deploying ladder sections. During closing, the access panel is energized to retract the ladder sections and close the access panel. The motor is energized to close the access panel until a stow latch engages to stow the access panel during non-use. A safety switch is mounted inside the attic space to allow a user to open the panel and extend the ladder should the user be trapped in the attic space.

U.S. Patent Application 20070181364 to Lair discloses an access panel is shown in the present invention to provide easy and safe access to an attic space or elevated structure. The access panel is fully automatic. During opening, the access panel only uses gravitational forces for opening a cover. Only during closing is the access panel motorized. The gravitational forces are used to both open the cover and extend the ladder sections, while the motor is only used to retract the latter sections and close the cover. A stow latch keeps the cover closed during non-use. A safety switch keeps the access panel from accidentally opening and the ladder sections from lowering if the stow latch is released. A mechanical lock keeps the cover open when the ladder sections have been lowered.

U.S. Patent Application 20090255757 to Burke discloses a folding attic stair assembly comprises a rectangular outer mounting frame. An inner stairway carrying frame is mounted by a hinge at one end of the outer mounting frame for movement between a raised stored position on the outer mounting frame and a lowered position extending downwardly from the mounting frame. An extendable attic stair is mounted on the inner frame. A pair of folding support arms extend between the outer mounting frame and the inner stairway carrying frame. A cable connects between each folding support arm and an associated reel mounted on a drive shaft which is connected to a drive motor. This drive motor is operable to wind and unwind the cables on the reels to raise and lower the attic stair in a controlled manner.

U.S. Patent Application 20120199417 to Richey; et al. discloses a remote controlled overhead ladder system including a ladder structure having at least a first section and a second section. The ladder structure can be mounted to a support structure located above an opening of the overhead surface, and can include a remote controlled lifting cable connected to the first and second sections such that upon receipt of a remote control signal, the lifting cable pivots the second section toward a front surface of the first section until the second section is oriented adjacent to the front surface of the first section, at which time the lifting cable pivots the first section and the adjacent second section as a group toward the overhead surface until the ladder sections are contained above the overhead surface.

Although the aforementioned prior art have contributed to the development of the art of lifts for transitioning an individual or object from a lower elevation to an upper elevation none of these prior art patents have solved the needs of this art.

Therefore, it is an object of the present invention to provide an improved lift.

Another object of this invention is to provide an improved lift that is easily positioned between a storage position and a utilizing position.

Another object of this invention is to provide an improved lift that will improve the safety of transitioning an individual or object between a lower surface and an upper surface.

Another object of this invention is to provide an improved lift that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

A specific embodiment of the present invention is shown in the attached drawings. For the purpose of summarizing the invention, the invention relates to a lift for ascending and descending between a lower elevation and an upper elevation. The lower elevation has a lower surface and the upper elevation having an upper surface. The lift comprises a main frame coupled to the upper surface. A carrier frame transitions between the lower elevation and the upper elevation. A drive is coupled to the main frame. A linkage extends between the carrier frame and the drive. A linkage block system is coupled to the main frame and engages the linkage for redirecting the direction of the linkage. A drive coupler secures the drive to the main frame. The drive coupler defines an eccentric position relative to the main frame for positioning the drive in an offset orientation relative to the main frame.

In one embodiment of the invention, the main frame includes a primary main frame and a secondary main frame. The linkage block system includes a primary linkage block and a secondary linkage block. The primary linkage block is rotatably coupled to the primary main frame and the secondary linkage block is rotatably coupled to the secondary main frame.

In another embodiment of the invention, the drive coupler includes a drive coupler adjustment member for adjustably coupling the drive to the main frame. The drive coupler adjustment member permits adjustable displacement of the drive relative to the main frame.

In another embodiment of the invention, the main frame includes a primary main frame and a secondary main frame. The drive coupler includes a primary drive coupler adjustment member and a secondary drive coupler adjustment member for adjustably coupling the drive to the main frame. The primary drive coupler adjustment member and the secondary drive coupler adjustment member permit adjustable displacement of the drive relative to the main frame.

In another embodiment of the invention, the eccentric position of the drive coupler relative to the main frame defines a side mount in the drive relative to the main frame. The side mount positions the drive to the side of the main frame.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
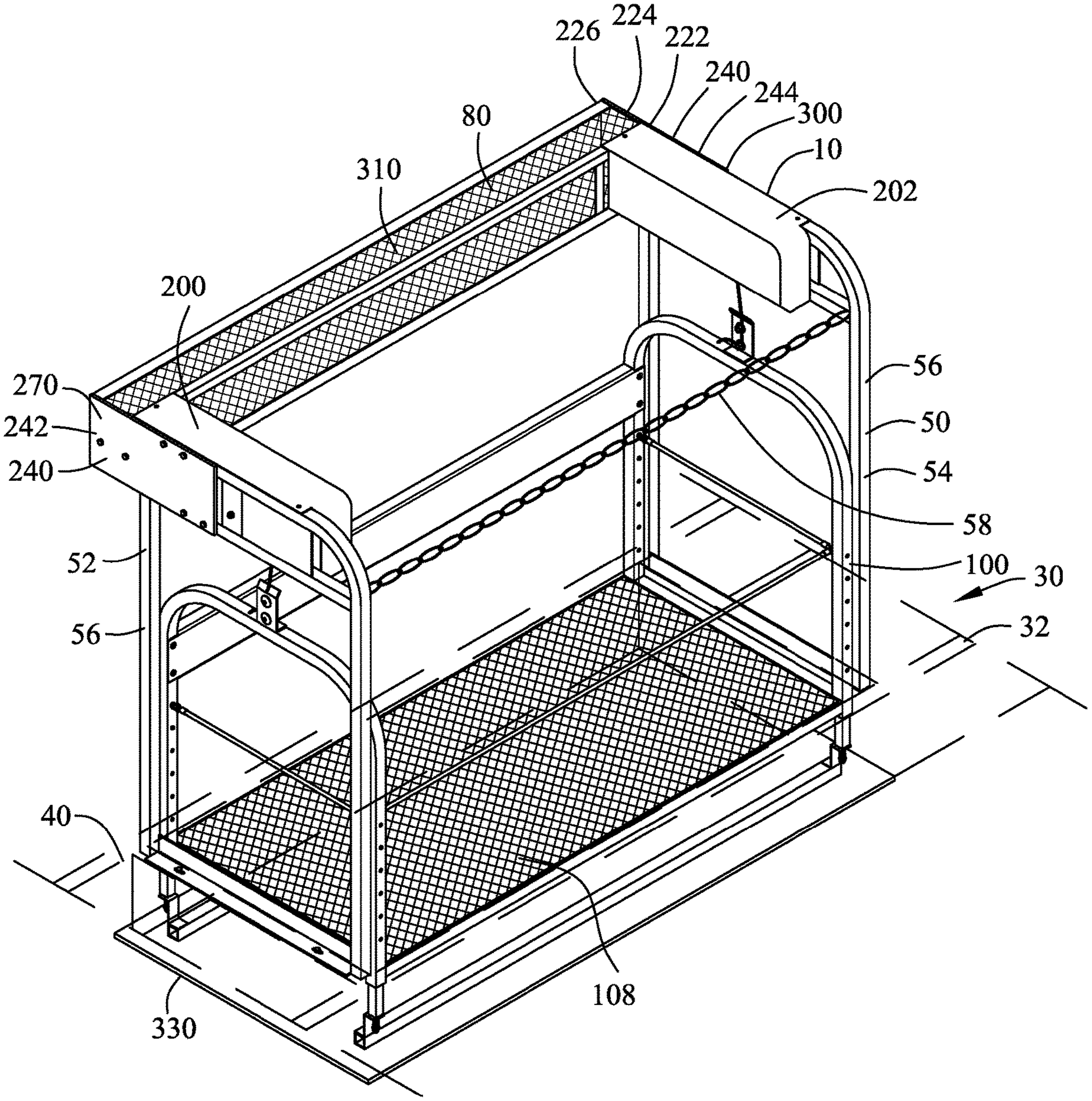
FIG. 1 is a front isometric view of a lift in an elevated position.
Figure 2:
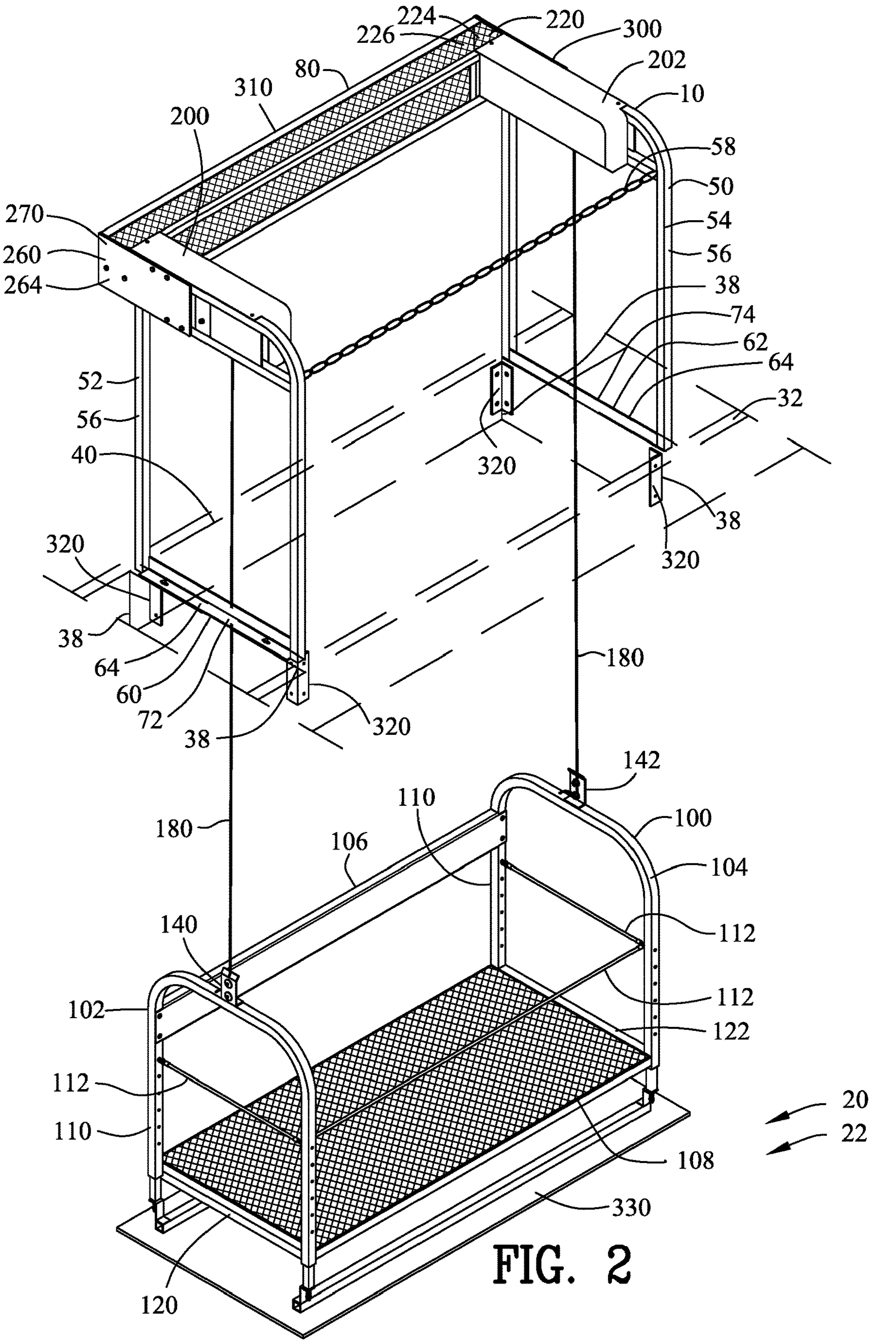
FIG. 2 is a view similar to FIG. 1, illustrating the lift in a descended position.
Figure 3:
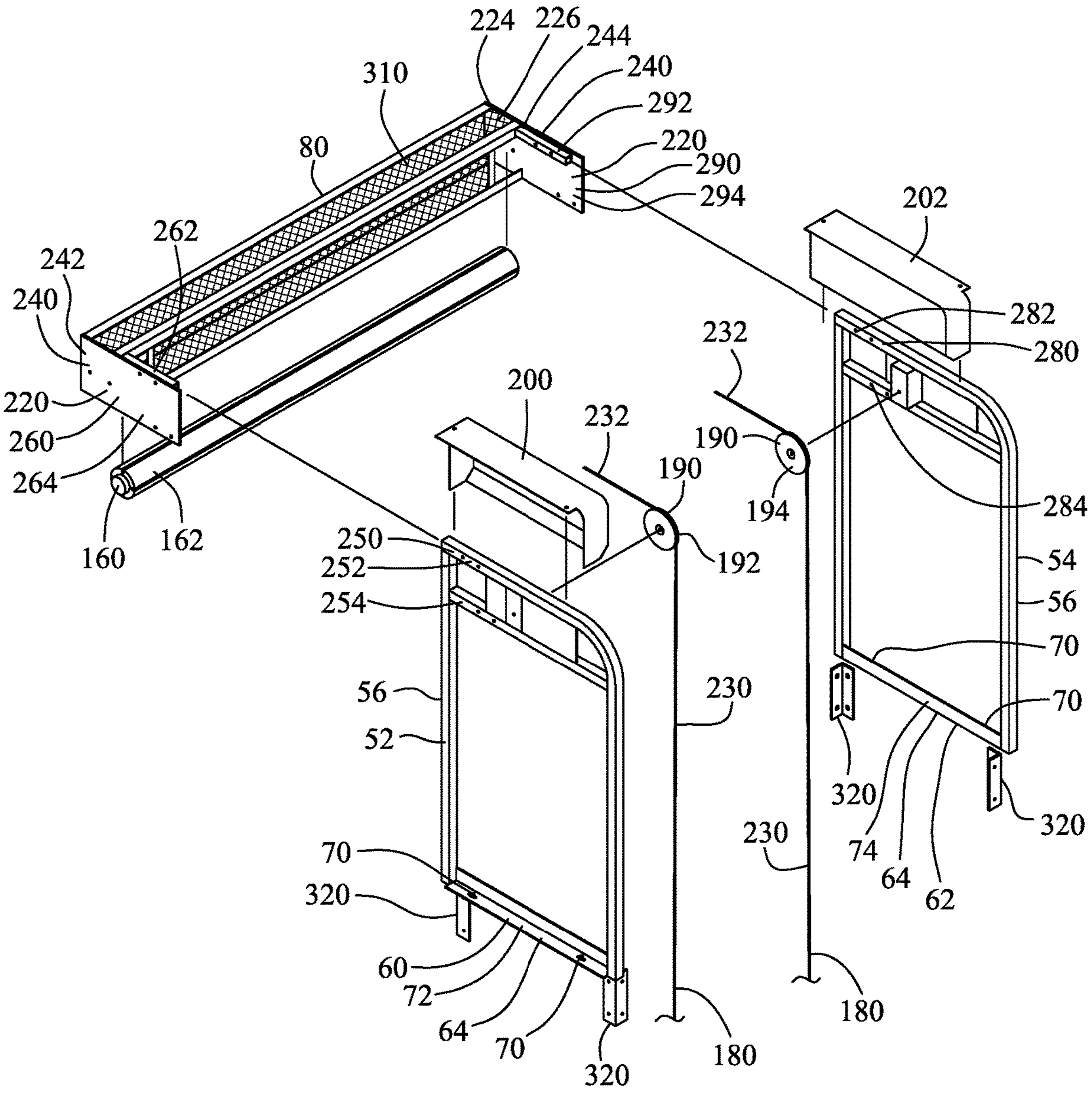
FIG. 3 is an exploded view of a main frame in FIG. 1.
Figure 4:
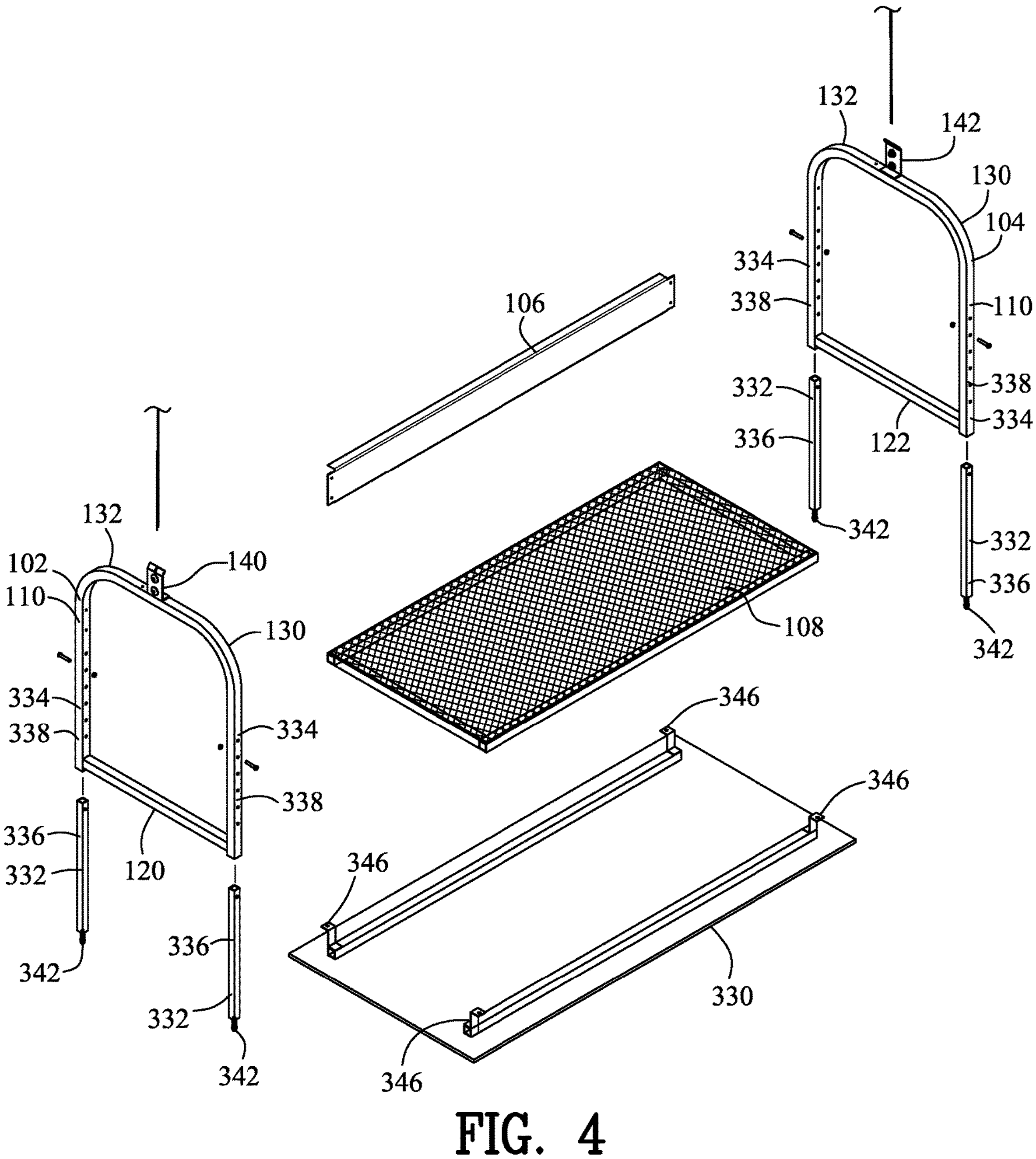
FIG. 4 is an exploded view of a carrier frame in FIG. 1.
Figure 5:
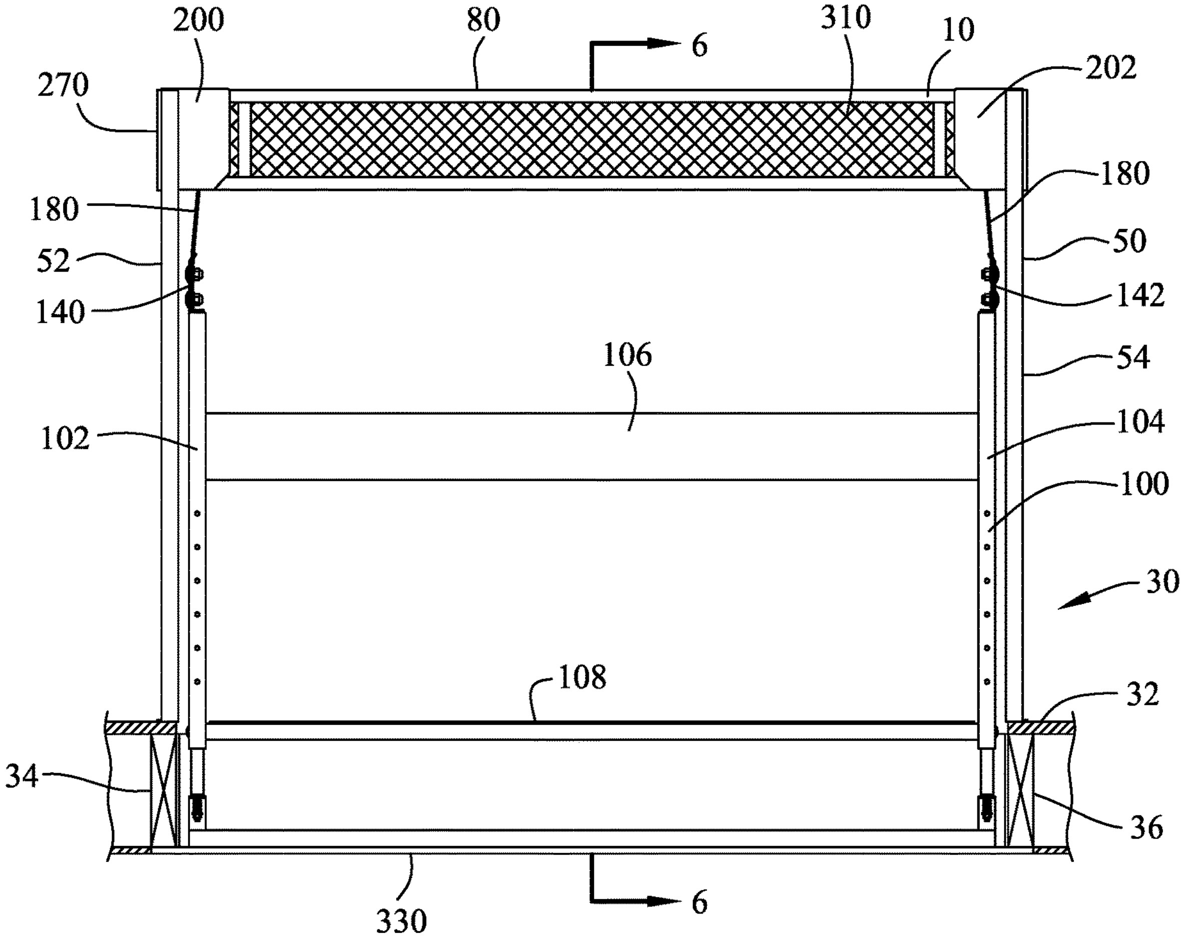
FIG. 5 is a front view of FIG. 1.
Figure 6:
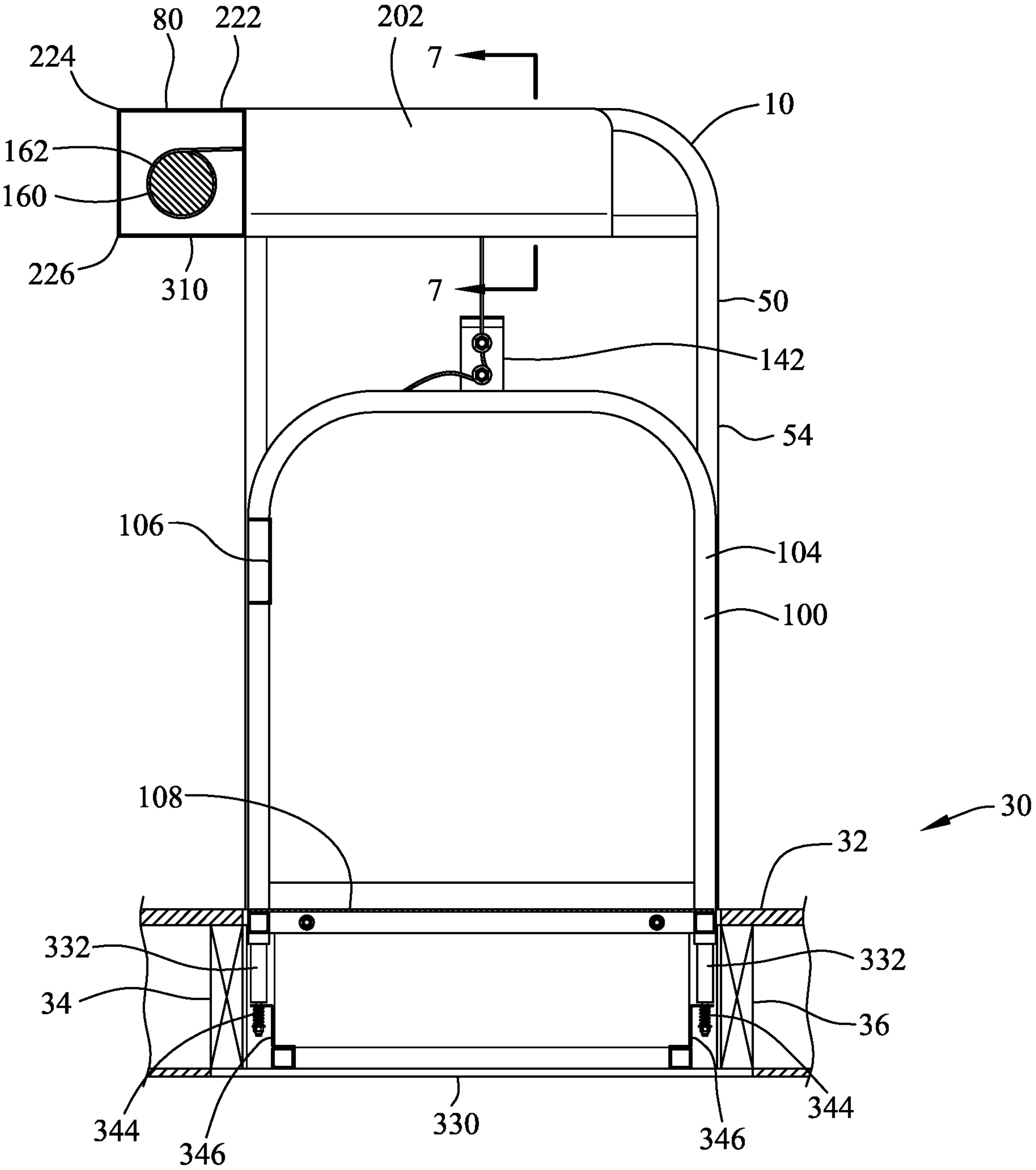
FIG. 6 is a sectional view along line 6-6 in FIG. 5.
Figure 7:
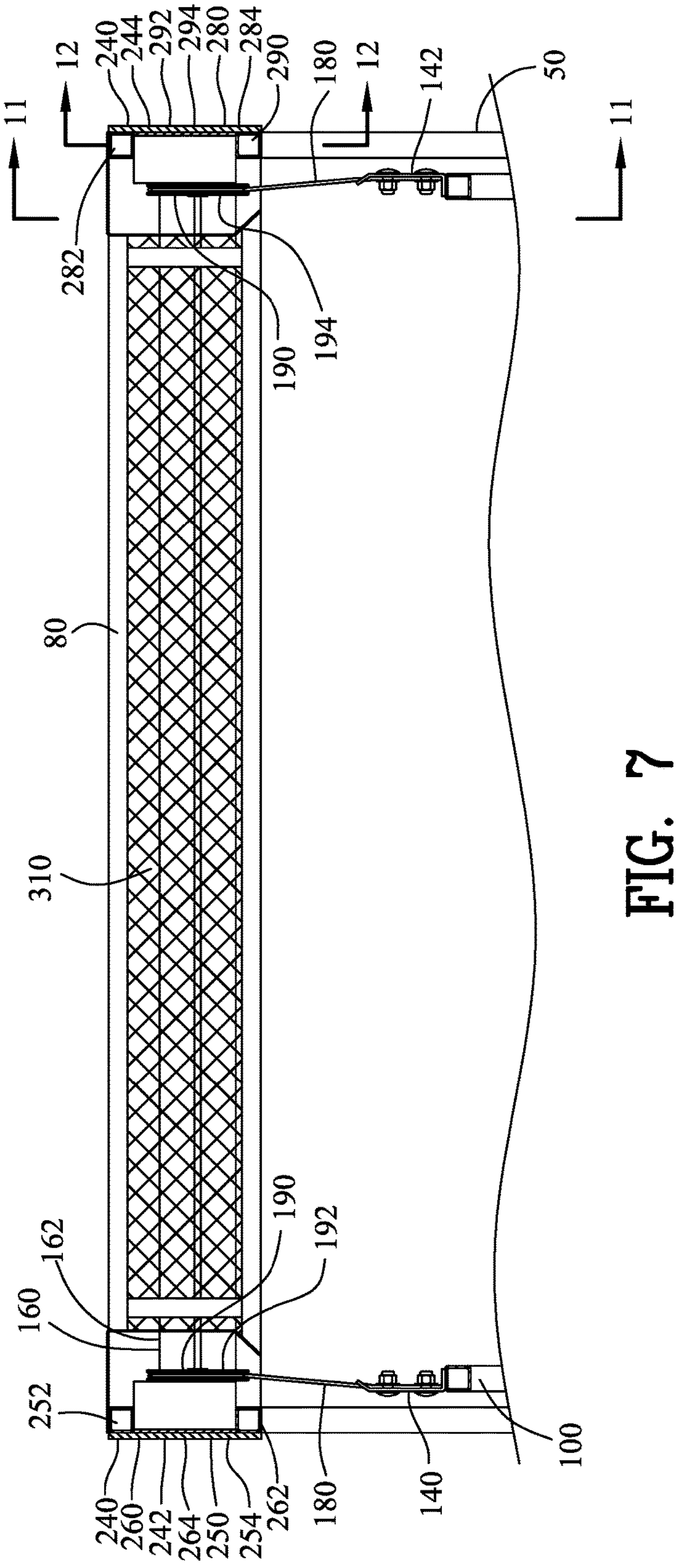
FIG. 7 is a sectional view along line 7-7 in FIG. 6.
Figure 8:
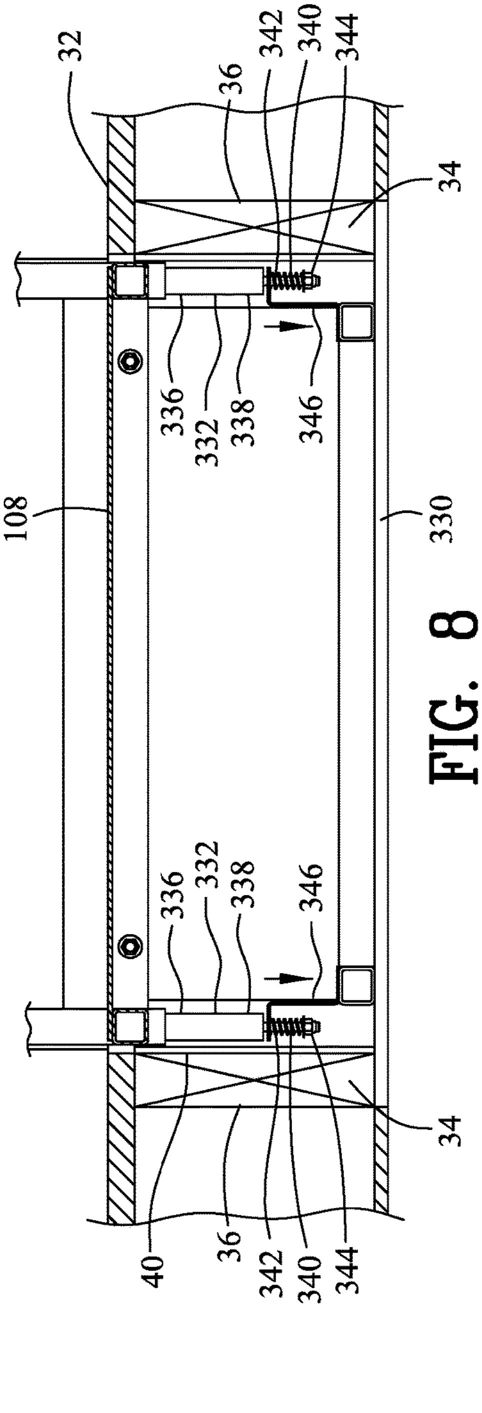
FIG. 8 is an enlarged view of a portion of FIG. 1.
Figure 9:
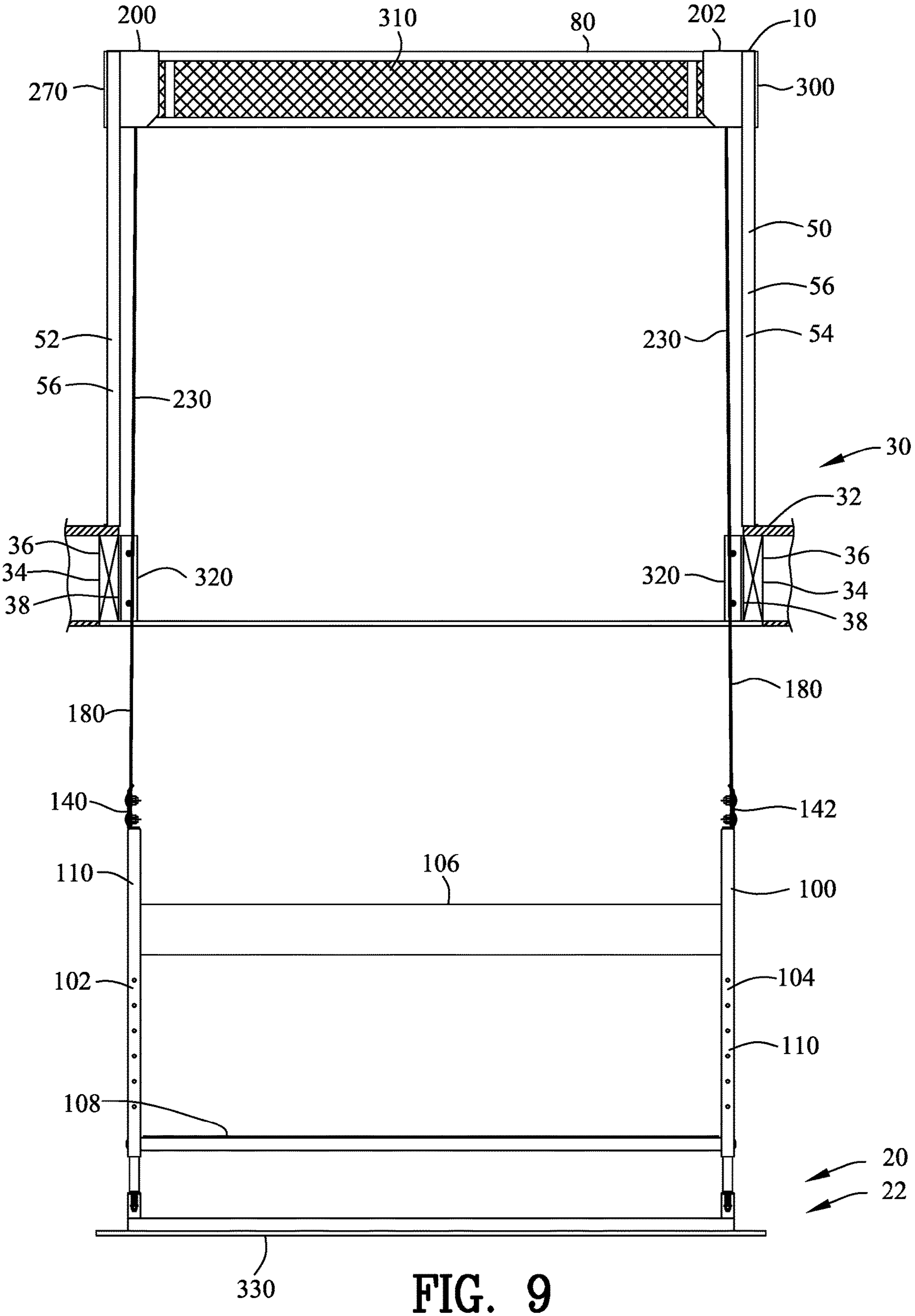
FIG. 9 is front view of FIG. 2.
Figure 10:
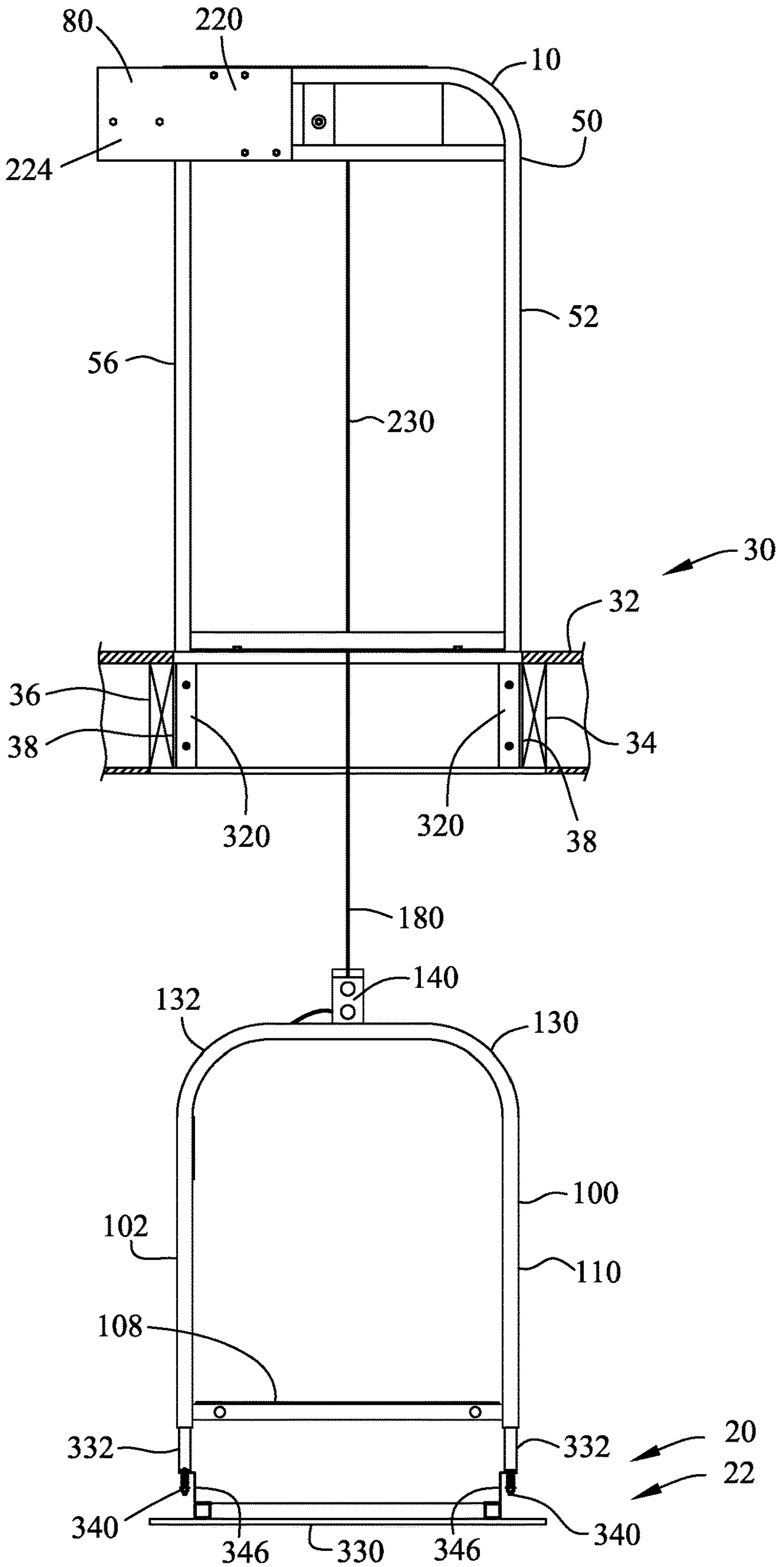
FIG. 10 is a left side view of FIG. 9.
Figure 11:
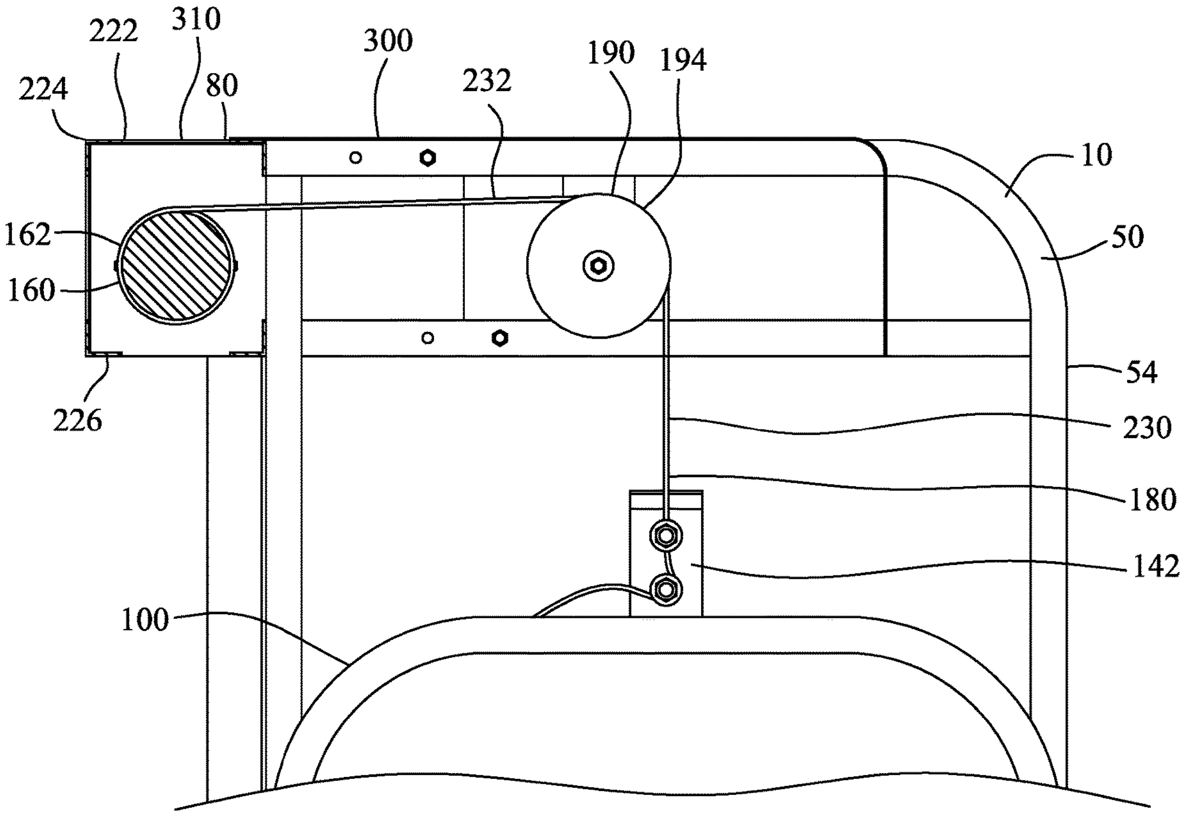
FIG. 11 is a sectional view along line 11-11 in FIG. 7.
Figure 12:
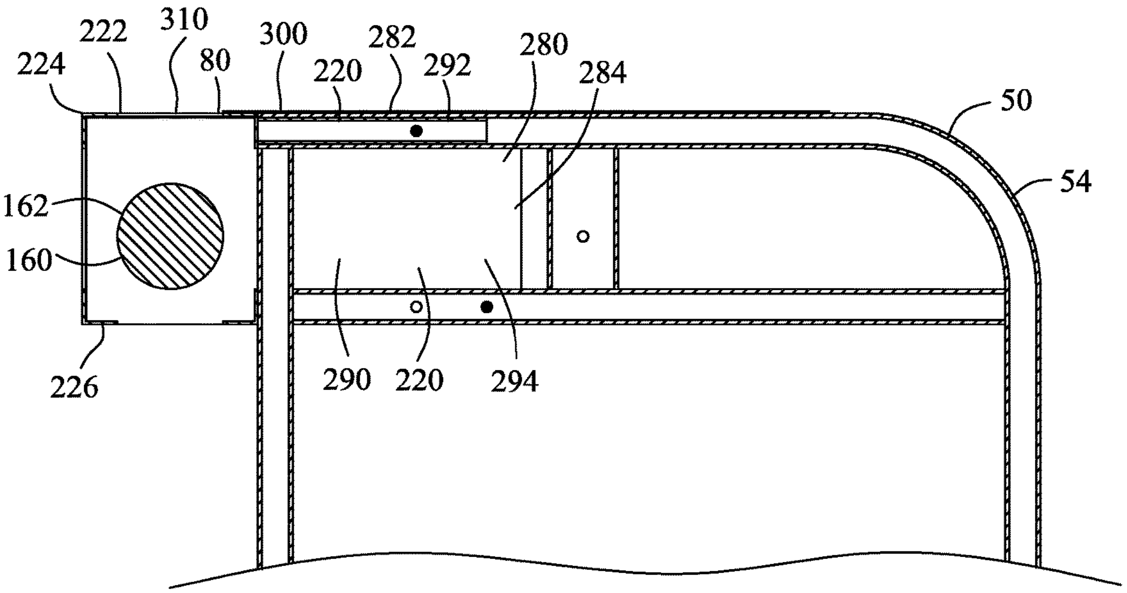
FIG. 12 is a sectional view along line 12-12 in FIG. 7 illustrating a first adjustable position of a drive relative to the main frame.
Figure 13:
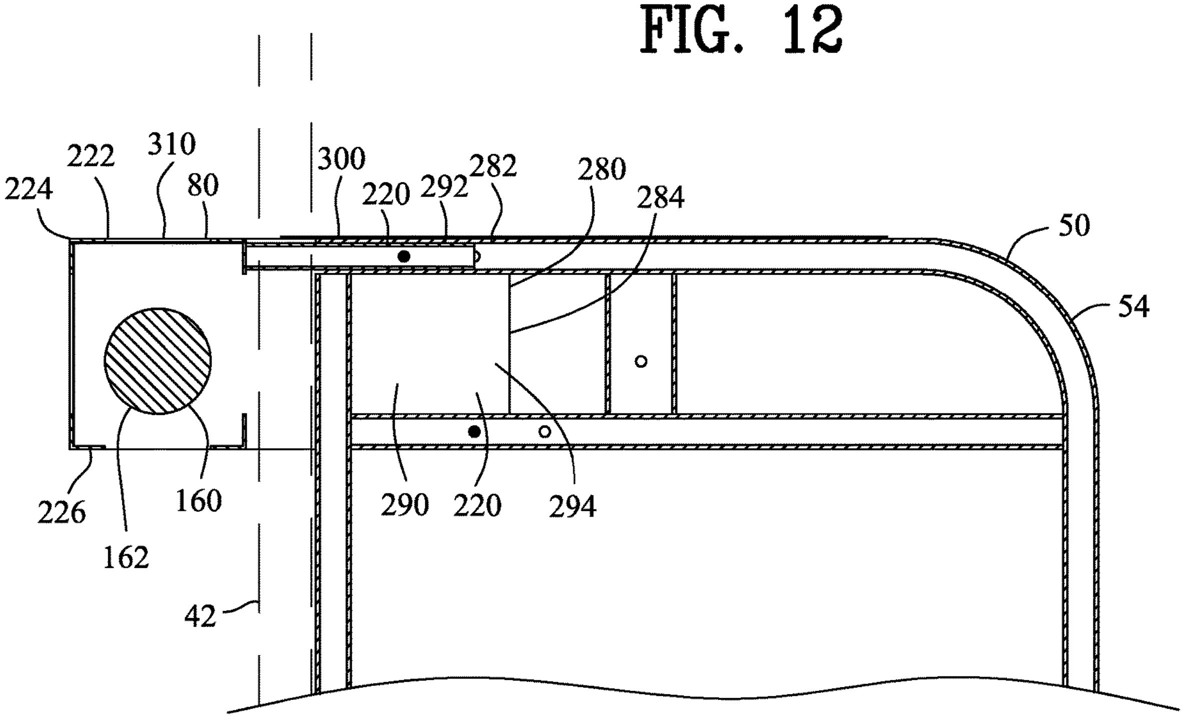
FIG. 13 is a view similar to FIG. 12, illustrating a second adjustable position of the drive relative to the main frame.

FIGS. 1-13 illustrate a lift 10 for ascending and descending between a lower elevation 20 and an upper elevation 30. The lower elevation 20 has a lower surface 22 and the upper elevation 30 has an upper surface 32. The lift 10 may be utilized in a commercial building, a residential building, a storage facility, or other structure. As such, the lower surface 22 may include a garage floor, an office floor, a residence floor, or a construction floor. Furthermore, the upper elevation 30 may include an attic, a second office area, a second residence area or a second construction area. The upper surface 32 may include a plurality of joists 34. The plurality of joists 34 have a joist height 36 and joist corners 38. An opening 40 may be within the plurality of joists 34 for positioning the lift 10 over the opening 40. One or more trusses 42 may reside above the upper surface 32. FIGS. 1, 2, 5 and 8-10 illustrate the lift 10 secured to the upper surface 32 and positioned over the opening 40. The opening 40 may include the dimensions of 22.5"×49.5".

The lift 10 comprises a main frame 50 coupled to the upper surface 32. The main frame 50 may include a primary main frame 52 and a secondary main frame 54. A frame couple 80 extends between the primary main frame 52 and a secondary main frame 54 for securing the primary main frame 52 to the secondary main frame 54. The main frame 50 may be constructed from square tubular elongated members 56. The construction material of the main frame 50 may be metallic, carbon fiber, polymeric or other rigid materials. The main frame 50 may further include a primary base 60 and a secondary base 62. The primary base 60 and the secondary base 62 may be constructed from L-shaped elongated members 64. The construction material of the primary base 60 and the secondary base 62 may be metallic, carbon fiber, polymeric or other rigid materials. The primary base 60 and the secondary base 62 are positioned adjacent to the opening 40. A safety main frame tether 58 may extend between the primary main frame 52 and the secondary main frame 54 for preventing individuals positioned in the upper elevation 30 from falling through the opening 40.

The primary base 60 and the secondary base 62 may have a plurality of elongated apertures 70 for defining a primary base adjustment member 72 in the primary base 60 and a secondary base adjustment member 74 in the secondary base 62. The primary base adjustment member 72 adjustably couples the main frame 50 to the upper surface 32. The secondary base adjustment member 74 adjustably couples the main frame 50 to the upper surface 32. The primary base adjustment member 72 and the secondary base adjustment member 74 permit adjustable displacement of the main frame 50 relative to the upper surface 32.

A carrier frame 100 is transitioned between the lower elevation 20 and the upper elevation 30. The carrier frame 100 may support one or more individuals and or objects that require transition between the lower elevation 20 and the upper elevation 22 the carrier frame 100 may include a primary carrier frame 102 and a secondary carrier frame 104. A carrier couple 106 extends between the primary carrier frame 102 and the secondary carrier frame 104 for securing the primary carrier frame 102 to the secondary carrier frame 104. A carrier floor 108 extends between the primary carrier frame 102 and the secondary carrier frame 104 for supporting one or more individuals and or objects. The carrier frame 100 may be constructed from square tubular elongated members 110. The construction material of the carrier frame 100 may be metallic, carbon fiber, polymeric or other rigid materials. The carrier frame 100 may further include a primary carrier base 120 and a secondary carrier base 122. The primary carrier base 120 and the secondary carrier base 122 may be constructed also from square tubular elongated members 110. The construction material of the primary carrier base 120 and the secondary carrier base 122 may be metallic, carbon fiber, polymeric or other rigid materials. A safety carrier frame tether 112 may extend between the primary carrier frame 102 and the secondary carrier frame 104 for maintaining the one or more individuals and or objects within the carrier frame 100.

The primary carrier base 120 and the secondary carrier base 122 may include a first upper arcuate side 130 and a second upper arcuate side 132 for facilitating the positioning of the carrier frame 100 through the opening 40 and above the upper surface 32. A primary tether lock 140 may be coupled to the primary carrier frame 102 and a secondary tether lock 142 may be coupled to the secondary carrier frame 104.

A drive 160 is coupled to the main frame 50. A linkage 180 extends between the carrier frame 100 and the drive 160. The linkage 180 may be secured to the primary tether lock 140 of the primary carrier frame 102 and the secondary tether lock 142 of the secondary carrier frame 104 and thereafter engage with the drive 160. The linkage 180 may include one or more metallic cable, rope, chain, synthetic line or other tethers. The drive 160 may include a tubular motor 162 rotatably coupled to the main frame 50. The linkage 180 may spiral about the tubular motor 162 upon activating the tubular motor 162 for distancing the carrier frame 100 from the lower surface 22. The linkage 180 un-spirals about the tubular motor 162 upon activating the tubular motor 162 for distancing the carrier frame 100 from the upper surface 32.

A linkage block system 190 may be coupled to the main frame 50 and engages the linkage 180 for redirecting the direction of the linkage 180. The linkage block system 190 may include a primary linkage block 192 and a secondary linkage block 194. The primary linkage block 192 is rotatably coupled to the primary main frame 52 and the secondary linkage block 194 is rotatably coupled to the secondary main frame 54. A primary guard 200 may be coupled to the primary main frame 52 of the main frame 50 for covering the primary linkage block 192 and a portion of the linkage 180. Similarly, a secondary guard 202 may be coupled to the secondary main frame 54 of the main frame 50 for covering the secondary linkage block 194 and a portion of the linkage 180. The primary guard 200 and the secondary guard 202 prevents the inadvertent positioning of an object and or a portion of an individual such as hair or finger between the linkage block system 190 and the linkage 180 whereby preventing damage to the object or injury to the individual.

A drive coupler 220 may secure the drive 160 to the main frame 50. Furthermore, the drive coupler 220 may secure the tubular motor 162 to the main frame 50. The drive coupler 220 defines an eccentric position 222 relative to the main frame 50 for positioning the drive 160 in an offset orientation 224 relative to the main frame 50. The eccentric position 222 of the drive coupler 220 relative to the main frame 50 may define a side mount 226 in the drive 160 relative to the main frame 50. The side mount 226 positions the drive 160 to the side of the main frame 50.

The linkage block system 190 facilitates the side mount 226 of the drive 160 redirecting the linkage 180 between a vertical linkage orientation 230 and a horizontal linkage orientation 232. The positioning of the drive 160 in a side mount 226 position may significantly reduce the overall height of the lift 10. By reducing the overall height of the lift 10, the lift 10 may be utilized in areas which have height restrictions. Furthermore, the positioning of the drive 160 in the side mount 226 position may provide better access to the carrier frame 100 in the upper elevation 30. By improving the access to the carrier frame 100 in the upper elevation 30, an object and/or individual may be positioned on or removed from the carrier frame 100 with much more ease.

The drive coupler 220 may include a drive coupler adjustment member 240 for adjustably coupling the drive 160 to the main frame 50. The drive coupler adjustment member 240 permits adjustable displacement of the drive 160 relative to the main frame 50. More specifically, the drive coupler 220 may include a primary drive coupler adjustment member 242 and a secondary drive coupler adjustment member 244 for adjustably coupling the drive 160 to the main frame 50. The primary drive coupler adjustment member 242 and the secondary drive coupler adjustment member 242 permit adjustable displacement of the drive 160 relative to the main frame 50.

The primary drive coupler adjustment member 242 may include a primary main frame track 250 that is coupled to the primary main frame 52 and a primary coupler frame track 260 that is coupled to the drive 160. The primary main frame track 250 may include a square tubing receiver 252. The primary main frame track 250 may include a plate receiver 254. The primary coupler frame track 260 may include a square tubing projection 262. The primary coupler frame track 260 may include a plate projection 264.

The square tubing projection 262 is slidably inserted within the square tubing receiver 252 for defining a first telescoping adjustment 270. The plate projection 264 is slidably displaced relative to the plate receiver 254 for defining the first telescoping adjustment 270. A pin, bolt, clamp or other fastening means may be utilized to lock the first telescoping adjustment 270.

The secondary drive coupler adjustment member 244 may include a secondary main frame track 280 that is coupled to the secondary main frame 54 and a secondary coupler frame track 290 that is coupled to the drive 160. The secondary main frame track 280 may include a square tubing receiver 282. The secondary main frame track 280 may include a plate receiver 284. The secondary coupler frame track 290 may include a square tubing projection 292. The secondary coupler frame track 290 may include a plate projection 294.

The square tubing projection 292 is slidably inserted within the square tubing receiver 282 for defining a second telescoping adjustment 300. The plate projection 294 is slidably displaced relative to the plate receiver 284 for defining the second telescoping adjustment 300. A pin, bolt, clamp or other fastening means may be utilized to lock the second telescoping adjustment 300. The primary drive coupler adjustment member 242 and the secondary drive coupler adjustment member 244 provides the ability to vary the position of the drive 160 relative to the main frame 50. This adjustment may provide beneficial if the lift 10 is utilized in locations with restrictive dimensions or areas. More specifically, this adjustment may be used for avoiding an obstacle that resides above the upper surface 32 such as a truss 42, electrical equipment, plumbing equipment, or other structure.

A drive guard 310 may be coupled to the main frame 50 for covering the drive 160 and a portion of the linkage 180. The drive guard 310 may also be coupled to the frame couple 80. Alternatively, the drive guard 310 may serve as the frame couple 80 for securing the primary main frame 52 to the secondary main frame 54. Preferably, the drive guard 310 is coupled to the frame couple 80, the primary drive coupler adjustment member 242 and the secondary drive coupler adjustment member 244 such that the drive guard 310 remains stationary relative to the drive 160 during adjustment of the drive 160 relative to the main frame 50. The drive guard 310 prevents the inadvertent positioning of an object and or a portion of an individual such as hair or finger between the drive 160 and the linkage 180 whereby preventing damage to the object or injury to the individual.

The lift 10 may further include a plurality of guiding members 320 coupled to the upper surface 32 for guiding the carrier frame 100 during positioning the carrier frame 100 adjacent to the upper surface 32. The plurality of guiding members 320 may include L shaped brackets secured within the corners of the opening 40. The plurality of guiding members 320 may also prevent damage to the upper surface 32 by repetitive contact between the carrier frame 100 and the upper surface 32.

A cover panel 330 may be secured to the carrier frame 100 for covering a portion of the carrier frame 100. The cover panel 330 may further be utilized for concealing the opening 40 where the carrier frame 100 is in an elevated position and adjacent to the upper surface 32. The cover panel 330 may be adjustably coupled to the carrier frame 100 by a plurality of cover adjustment members 332. The plurality of cover adjustment members 332 permit adjustable displacement of the cover panel 330 relative to the carrier frame 100.

The plurality of cover adjustment members 332 may include a square tubing receiver 334 and a square tubing projection 336. The square tubing receiver 334 may reside within the primary carrier frame 102 and the secondary carrier frame 104. The square tubing projection 336 may be coupled to the cover panel 330 and the slidably inserted within the square tubing receiver 334 for defining a panel telescoping adjustment 338. A pin, bolt, clamp or other fastening means may be utilized to lock the panel telescoping adjustment 338. The panel telescoping adjustment 338 provides the ability to vary the position of the cover panel 330 relative to the carrier frame. This adjustment may provide beneficial since the joist height 36 of the plurality of joists 34 may vary largely from one location to another.

A plurality of cover suspension members 340 may couple the cover panel 330 to the carrier frame 100. The plurality of cover suspension members 340 may include a strut 342 extending from the carrier frame 100. A coiled spring 344 encircles the strut 342. A connecting bracket 346 is secured to the cover panel 330 and the strut 342. The connecting bracket 346 is positioned between the carrier frame 100 and the coiled spring 344. Upon the contact of the cover panel 330 with the upper surface 32, the connecting bracket 346 compresses the coiled spring 344. Each of the plurality of cover suspension members 340 may compress the coil springs 344 at different displacements depending upon the regular surfaces in the upper surface 32. The plurality of cover suspension members 340 permit a cushioned and continuous engagement between the cover panel 330 and the upper surface 32.

The carrier frame 100 is transitioned between the lower elevation 20 and the upper elevation 30 by activation of the drive 160. The drive 160 may include a tubular motor 162 rotatably coupled to a drive coupler 220. The drive 160 may be controlled by an electrical circuit that may include a wireless remote. The tubular motor 162 may further include a smart or programmable function for programming the lower position and the upper position of the lift 10 into a memory. The tubular motor 162 may include a radio controlled awning motor. A safety button may be electrically coupled to the drive 160. The safety button may be installed within the upper elevation for activating the drive 160 and lowering the lift 10 if someone is inadvertently closed into the upper elevation 30.

A linkage 180 is coupled between the drive 160 and the carrier frame 100. The linkage 180 may include a metallic cable, polymer cable, Teflon cable or other flexible elongated members. The linkage 180 may include a linkage loop wherein the two ends engage the tubular motor 162. The linkage 180 spirals about the tubular motor 162 for reducing the length of the linkage 180 and distancing the carrier frame 100 from the lower surface 22. Alternatively, the linkage 180 un-spirals about the tubular motor 162 for increasing the length of the linkage 180 and distancing the carrier frame 100 from the upper surface 32.

A terminating switch may be incorporated into the lift 10 for disengaging the power source to the tubular motor 162 and terminating rotation of the tubular motor 162. More specifically, if the carrier frame 100 is in a descending displacement and an obstruction object contacts the carrier frame 100, the tensile stress in the linkage 180 will be removed causing the terminating switch to halt the tubular motor 162. The obstruction object may include an individual, an object, pet or other items.

The lift 10 is designed such that the main frame 50 and the carrier frame 100 may be shipped an individual components and easily constructed at the installation site. Both the main frame 50 and the carrier frame 100 may be assembled using ordinary screw, bolts or other fasteners. Since the main frame 50 and the carrier frame 100 may be constructed of individual components, the storage, shipping and handling of the packaged lift 10 is more effective.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A lift for ascending and descending between a lower elevation and an upper elevation, the lower elevation having a lower surface and the upper elevation having an upper surface, the lift, comprising:

a main frame coupled to the upper surface;

a carrier frame transitioning between the lower elevation and the upper elevation;

a drive coupled to said main frame;

a linkage extending between said carrier frame and said drive;

a linkage block system coupled to said main frame and engaging said linkage for redirecting the direction of said linkage;

a drive coupler securing said drive to said main frame;

said drive coupler defining an eccentric position relative to said main frame for positioning said drive in an offset orientation relative to said main frame;

said main frame includes a primary main frame and a secondary main frame;

said linkage block system including a primary linkage block and a secondary linkage block;

said primary linkage block rotatably coupled to said primary main frame and said secondary linkage block rotatably coupled to said secondary main frame;

said drive coupler including a primary drive coupler adjustment member and a secondary drive coupler adjustment member for adjustably coupling said drive to said main frame;

said primary drive coupler adjustment member and said secondary drive coupler adjustment member permitting adjustable displacement of said drive relative to said main frame;

said eccentric position of said drive coupler relative to said main frame defines a side mount in said drive relative to said main frame;

said side mount positioning said drive to the side of said main frame;

said primary drive coupler adjustment member defining a tubing receiver and a tubing projection;

said secondary drive coupler adjustment member defining a tubing receiver and a tubing projection;

said tubing projection slidably engaging within said tubing receiver of said primary drive coupler adjustment member for defining a primary telescoping adjustment member; and said tubing projection slidably engaging within said tubing receiver of said secondary drive coupler adjustment member for defining a secondary telescoping adjustment member.

2. A lift for ascending and descending between a lower elevation and an upper elevation, the lower elevation having a lower surface and the upper elevation having an upper surface, the lift, comprising:

a main frame coupled to the upper surface;

a carrier frame transitioning between the lower elevation and the upper elevation;

a drive coupled to said main frame;

a linkage extending between said carrier frame and said drive;

a linkage block system coupled to said main frame and engaging said linkage for redirecting the direction of said linkage;

a drive coupler securing said drive to said main frame;

a side mount coupling said drive to the side of said main frame; and said side mount includes a first telescoping adjustment member and a second telescoping adjustment member permitting adjustable displacement of said drive relative to the side of said main frame.

3. The lift as set forth in claim 2, wherein said main frame includes a primary main frame and a secondary main frame;

said linkage block system including a primary linkage block and a secondary linkage block; and said primary linkage block rotatably coupled to said primary main frame and said secondary linkage block rotatably coupled to said secondary main frame.

4. The lift as set forth in claim 2, wherein said drive includes a tubular motor rotatably coupled to said drive coupler;

said linkage spiraling about said tubular motor for distancing said carrier frame from the lower surface; and said linkage un-spiraling about said tubular motor for distancing said carrier frame from the upper surface.

5. The lift as set forth in claim 2, wherein said linkage block system including a primary linkage block and a secondary linkage block;

a primary guard coupled to said main frame and covering said primary linkage block and a portion of said linkage; and a secondary guard coupled to said main frame and covering said secondary linkage block and a portion of said linkage.

6. The lift as set forth in claim 2, wherein said main frame includes a primary main frame and a secondary main frame; and a frame couple extending between said primary main frame and a secondary main frame for securing said primary main frame to said secondary main frame.

7. The lift as set forth in claim 2, further including a drive guard coupled to said main frame and covering said drive and a portion of said linkage.

8. The lift as set forth in claim 2, wherein said main frame includes a primary main frame and a secondary main frame;

a drive guard coupled to said main frame and covering said drive and a portion of said linkage; and said drive guard securing said primary main frame to said secondary main frame for defining a frame couple.

9. The lift as set forth in claim 2, further including a primary base adjustment member and a secondary base adjustment member coupled to said main frame;

said primary base adjustment member adjustably coupling said main frame to the upper surface;

said secondary base adjustment member adjustably coupling said main frame to the upper surface; and said primary base adjustment member and said secondary base adjustment member permitting adjustable displacement of said main frame relative to the upper surface.

10. The lift as set forth in claim 2, further including a plurality of guiding members coupled to the upper surface for guiding said carrier frame during positioning said carrier frame adjacent to the upper surface.

11. The lift as set forth in claim 10, further including a cover panel secured to said carrier frame for covering a portion of said carrier frame.

12. The lift as set forth in claim 11, further including a plurality of cover adjustment members adjustably coupling said cover panel to said carrier frame; and said plurality of cover adjustment members permitting adjustable displacement of said cover panel relative to said carrier frame.

13. The lift as set forth in claim 11, further including a plurality of cover suspension members coupling said cover panel to said carrier frame; and said plurality of cover suspension members permitting a cushioned and continuous engagement between said cover panel and the upper surface.

* * * * *